United States Patent
Pawlak, III et al.

(10) Patent No.: US 6,361,429 B1
(45) Date of Patent: Mar. 26, 2002

(54) REDUCED NOISE AUTOMOTIVE VENTILATION SYSTEM

(75) Inventors: John Lawrence Pawlak, III, Orchard Park; Steven Patrick Capp, N. Tonawanda, both of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/850,487

(22) Filed: May 7, 2001

(51) Int. Cl.[7] .................................................. B60H 1/00
(52) U.S. Cl. ........................................ 454/139; 454/141
(58) Field of Search .......................... 454/99, 139, 141, 454/145

(56) References Cited

U.S. PATENT DOCUMENTS

| | | | |
|---|---|---|---|
| 4,088,364 A | 5/1978 | Termont | 296/190.9 |
| 4,344,356 A * | 8/1982 | Casterton et al. | 454/139 |
| 4,467,706 A | 8/1984 | Bacheller et al. | 454/70 |
| 5,259,813 A * | 11/1993 | Abthoff et al. | 454/75 |
| 5,280,852 A * | 1/1994 | Dauvergne | 237/12.3 A |
| 5,308,279 A | 5/1994 | Grinberg | 454/139 |
| 5,449,321 A * | 9/1995 | Dauvergne | 454/139 |
| 5,716,269 A * | 2/1998 | Garbooshian | 454/139 |

* cited by examiner

Primary Examiner—Harold Joyce
Assistant Examiner—Derek S. Boles
(74) Attorney, Agent, or Firm—Patrick M. Griffin

(57) ABSTRACT

A reduced noise automotive ventilation system uses two blowers, a front mounted blower that pulls outside air in, and a rear mounted fan that exhausts interior air from the cabin space. By pulling and pushing in series, the speed of each blower is reduced, and the attendant blower noise is considerably reduced. In addition, a closed floor duct routes recirculated air from the rear to the front blower, eliminating the conventional open blower noise path to the vehicle interior in recirculation mode.

3 Claims, 2 Drawing Sheets

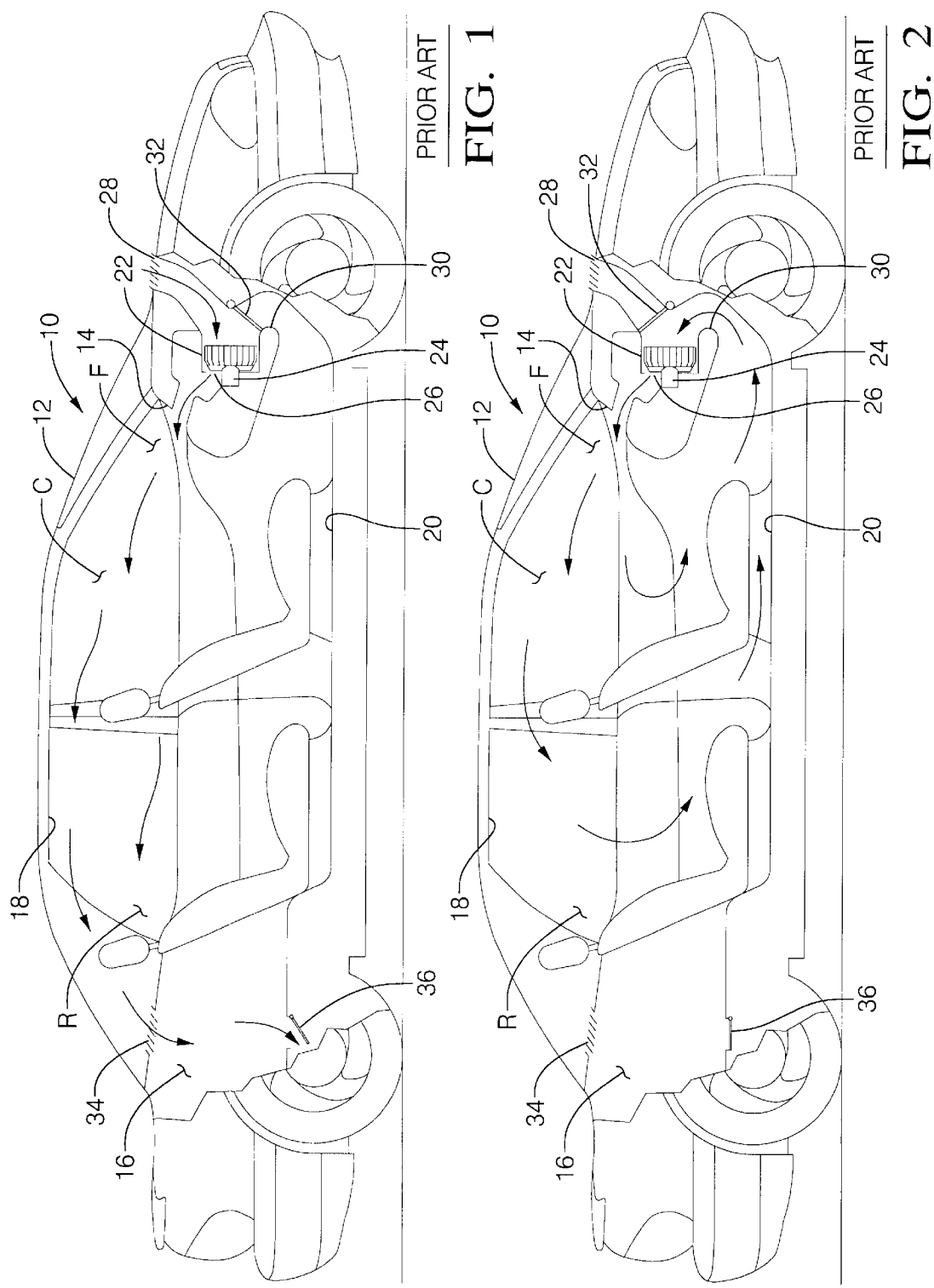

REDUCED NOISE AUTOMOTIVE VENTILATION SYSTEM

TECHNICAL FIELD

This invention relates to automotive ventilation systems in general, and specifically to such a system which uses a pair of in series blowers to reduce system noise.

BACKGROUND OF THE INVENTION

Typical vehicle bodies have what may be termed an interior or cabin space within which driver and passengers sit, and within which it is necessary to provide constant ventilation air flow and, preferably, to temper the air flow, as well. The cabin space is broadly comprised by a front bulkhead (structure such as instrument panels, etc, that wall off the engine compartment), a roof, floor, and rear bulkhead, defined generally as structure that walls off the rear seating area from the trunk. Conventional vehicle heating, air conditioning and ventilation systems (HVAC systems) consist basically of a box like housing, containing blower, heat exchangers, and air valves through which air is either pulled from outside the vehicle and blown into the cabin space, slightly pressurizing it, or recirculated within the vehicle.

In the "fresh" or outside air mode, the outside air that is pulled in by the blower is blown toward the rear of the cabin space and eventually, under the slight cabin pressure, flow through rear vents into the trunk space and passively exhausted back to the outside through conventional, passively acting vent valves. These are typically a one way acting rubber flap that can be blown slightly outward under pressure, but which close to prevent reverse flow. In recirculation mode, recirculated cabin air is pulled back up through a large under dash opening and into the HVAC housing before being blown back out. Blower noise is a concern with such a system. The single blower, since it provides all of the air moving power both for air introduction and air exhaustion, must turn at high RPMs, and noise goes up severely with higher blower speeds. Another cause of noise is the large under dash opening through which recirculated air is pulled. It represents a very direct blower noise path from the HVAC housing into the cabin space.

Multi blower ventilation systems are known. More than one blower would not, intuitively, seem to provide a noise reduction, and just the opposite in fact. Such systems do appear to be primarily directed at issues other than noise, and primarily at a desire to separate the fresh air introduction and interior air recirculation functions by providing a blower and ductwork dedicated independently to each function. For example, a farm tractor ventilation system disclosed in U.S. Pat. No. 4,344,356 shows a two blower system in which the two blowers operate in parallel to separate the fresh air introduction and in side air recirculation functions. The primary purpose of the system is to create a constant and high interior cabin pressurization to assure that exterior dust is not pulled in, a concern that is more pronounced with agricultural and earth moving equipment.

SUMMARY OF THE INVENTION

The subject invention provides a ventilation system directed primarily at on road vehicles in which a pair of blowers operate cooperatively and in series, rather than in parallel, to both create a front to rear, outside air ventilating flow, and to create an interior air, recirculating air flow, with reduced blower noise in each case, despite the extra blower.

In the embodiment disclosed, two blower housings are incorporated, a ventilation housing at the front of the cabin space and an exhaust housing at the rear. A continuous duct runs from the exhaust housing back to the ventilation housing, taking the place of the under dash opening into the ventilation housing for recirculated air. The ventilation housing has a valved blower which, in a ventilation mode, pulls in outside air into the cabin space, or, in a recirculation mode, pulls air from the front of the common duct. The exhaust housing has a blower which, in an exhaust mode, pulls in cabin air and exhausts it, under power, outside the vehicle, or instead blows air into rear of the common duct and back toward the ventilation housing.

The two blowers thus work in series, when each is in its ventilation mode, to pull outside air in at the front of the cabin space and exhaust it, actively, through the rear of the cabin space. The same air flow can be achieved with each blower turning at significantly less speed than a conventional single blower.

The two blowers also operate in series in recirculation mode, but recirculate interior cabin air from the front of the cabin space, to the rear, and then back to the front through the common duct. In addition, since, in recirculation mode, the return leg of the flow is through a continuous, closed common duct, there is no direct, open noise path either blower to the cabin space. Both the reduced fan speed and the closed duct serve to reduce perceived blower noise within the cabin space.

BRIEF DESCRIPTION OF THE DRAWINGS

These and other features of the invention will appear from the following written description, and from the drawings, in which:

FIG. 1 is a side view of a typical vehicle partially broken away to reveal the cabin space and showing a conventional ventilation system in ventilation mode;

FIG. 2 is a view like FIG. 1, but in recirculation mode;

DESCRIPTION OF THE PREFERRED EMBODIMENT

Figure 3:
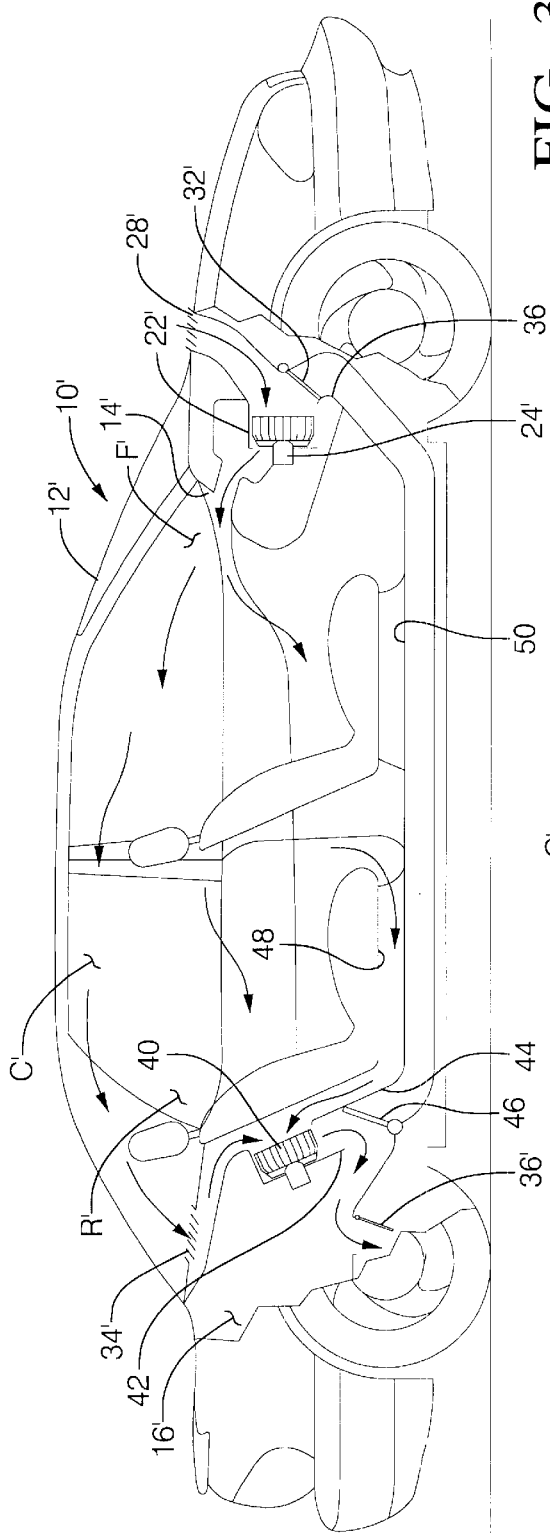
FIG. 3 is a side view of a typical vehicle and its cabin space, similar to FIG. 1, but incorporating a preferred embodiment of the ventilation system of the subject invention, in ventilation mode.

Referring first to FIG. 1, a typical vehicle, indicated generally at 10, has an interior cabin space, indicated generally at C, having a front area indicated generally at F, and a rear area indicated generally at R. The terms "front" and "rear" are intended to be very general, and the structures that define and delimit the front and rear will, in any particular case, differ. Typically, the front would be defined by a those structures in front of a front seat passenger or driver, such as windshield 12, instrument panel 14, and the like. The rear would be defined by structures such as the shelf 16 behind the rear passengers and whatever structure separates the rear seating from the trunk space 16. Above, the cabin space C would be bounded by the roof structure 18, and below by the floor 20. Terms such as "front" and "rear" are intended here to be inclusive, rather than exclusive, and relate more to the air movement inside the space C, than to its structural features. That is, air will move generally from front to rear, in a ventilation mode, and will circulate back again generally from rear to front in a recirculation mode. This will be generally true regardless of the physical structures that bound and define the cabin space C.

Referring next to FIGS. 1 and 2, in a conventional ventilation system, a housing 22 at the front of the cabin space C contains, in addition to one or more non illustrated heat exchangers, a blower 24 that forces air out of housing 22 and through a ventilation outlet 26 into the cabin space C. Blower 24 pulls air in through two alternate sources, a "fresh" or outside air inlet 28, which opens outside the cabin space C and a recirculation inlet 30 located below the outside air inlet 28, generally beneath the instrument panel 14. Blower 24 is located generally between outside air inlet 28 and recirculation air inlet 30. Located in front of blower 24 is a flapper door type air valve 32 which can be selectively swung back and forth between a ventilation mode, shown in FIG. 1, and a recirculation mode, shown in FIG. 2.

Referring to FIG. 1, in the ventilation mode, door 32 closes off the recirculation inlet 30 and opens the outside air inlet 28 to blower 24 and the inside of ventilation housing 22. Air is blown out of housing 22, through the ventilation outlet 26 into the cabin space C, and forced generally to the rear. Specifically, air flow is along the inside of windshield 12, along the roof 18 and, ultimately at the rear R of cabin space C, an exhaust vent 34 allows air to pass to the trunk space 16. From trunk face 16, air finally flows out of a conventional, passive one way vent valve 35 to the outside. Vent L valves like 36 are typically simple rubber flaps or membranes that work unidirectionally to let air out, but not back in. This keeps a continual flow of outside air through the cabin space C. Because all of the power for ventilation is provided by the single front mounted blower 24, it must turn fast enough to provide enough power to send the ventilation air all the way to the rear and exhaust it through vent valve 35. Since blower noise goes up dramatically with blower speed, high noise levels are almost inevitable. Proposals exist to dampen out such noise with insulation and baffles, but these muffle, rather than directly reduce, the noise, and also inevitably retard air flow.

Referring to FIG. 2, in the recirculation mode, door 32 swings up to close off outside air inlet 28 and open up recirculation air inlet to cabin space C. Now, blower 24 pulls interior air in through the recirculation air inlet 30, up through housing 22 and back through outlet 26 into the cabin space C. Air moves front to back and returns to the front in a more or less circular pattern. The blower 24 must turn just as fast, and now a very direct noise path is opened up from blower to the cabin space C through the wide open recirculation inlet 30.

Figure 4:
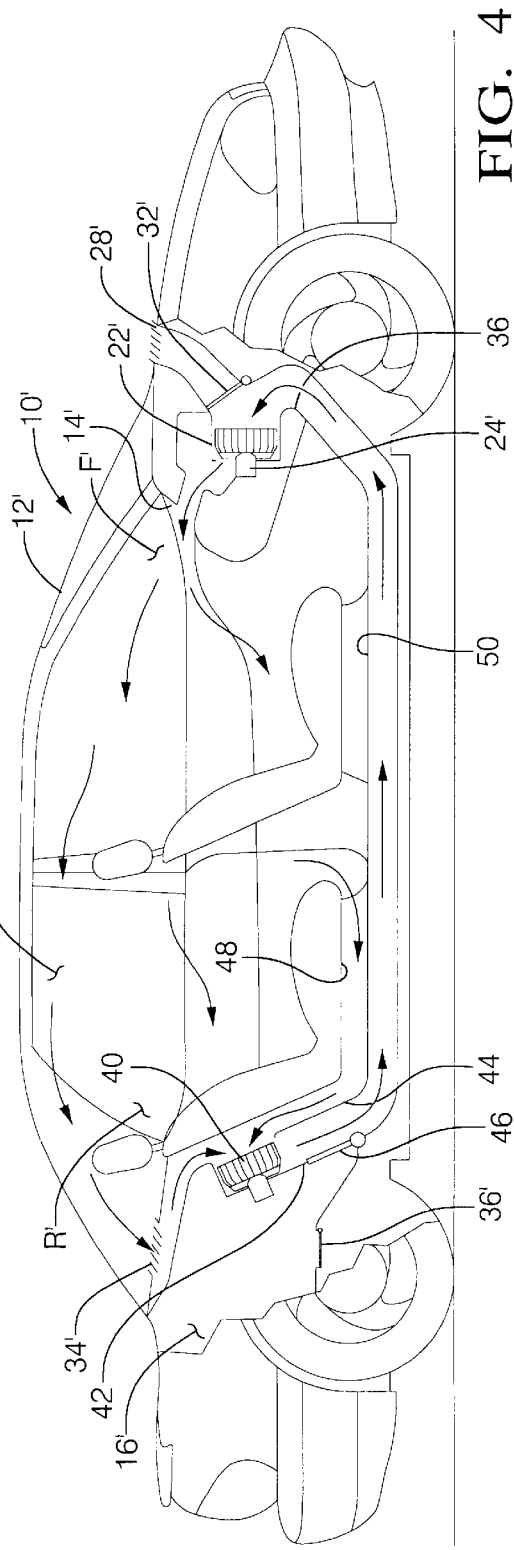
FIG. 4 is a view like FIG. 3, but in recirculation mode.

Referring next to FIGS. 3 and 4, a preferred embodiment of the ventilation system of the invention can be and is used in the same vehicle, with the same cabin space, trunk, etc, and all common elements are given the same number primed ('). One significant difference is that the recirculation Inlet 30 no longer represents a direct opening to cabin space C', and instead serves as a front duct port 36, described in more detail below. Several additional features are added, which cooperate with existing features and components, to create an improved ventilation operation and significantly reduced noise. Generally, a second, rear mounted housing and blower, as well as a closed common duct between the front and rear, act in series to boost ventilation power but, counter intuitively, to reduce blower noise. Specifically, an exhaust housing 38 is provided at the rear, generally between the rear seating and the trunk space 16', into which the exhaust vent 34' serves as a cabin air inlet, rather than venting into the trunk space 16' directly. Exhaust housing 38 contains a blower 40 similar to the front blower 24', which pulls air into exhaust housing 38 and expels it selectively through either an exhaust outlet 42 into trunk space 16', or through a rear duct port 44, as directed by a flapper door type air valve 46. In addition, in the embodiment disclosed, a second cabin air inlet 48 running beneath the rear seating. Extending continuously between the front and rear duct ports 36 and 44 is a closed, common duct 50, which runs generally along the floor 20', beneath the seating. These additional features work as described next.

Referring next to FIG. 3, when rear flapper door 46 is situated as shown, in what can be termed an exhaust mode, the front flapper door is concurrently moved to its ventilation mode. Now, rather than passively entering the trunk space 16', air from the rear of cabin space C', is actively exhausted by rear blower 40 into trunk space 16'. Interior air initially pushed toward the rear by front blower 24' is now actively pulled into exhaust housing 38, by rear blower 40, through exhaust vent 34' and additional inlet 48, and pushed through exhaust outlet 42 into trunk space 16'. Since the exhaust action is now active, rather than passive, the additional interior air inlet 48 prevents the conventionally sized vent 34' from limiting flow. Once in trunk space 16', air is passively vented to the outside through the vent valve 36. The rear blower 40 acts in concert or in series with the front blower 24', actively pushing out the outside ventilation air that it actively pulled in. Therefore, neither blower 24' nor 40 need turn as rapidly as conventional blower 24 would be required to turn to achieve the same ventilation air flow. Noise in the ventilation mode is thus significantly reduced, due to that factor alone.

Referring next to FIG. 4, when rear flapper door 46 is situated as shown, in a recirculation mode, the exhaust outlet 42 is closed off and the rear duct port 44 is opened. Concurrently, at the front, the front flapper door is situated so as to close off the outside air inlet 28', and open the front duct port 36. Now, air pulled into the exhaust housing through exhaust vent 34', by rear blower 40, is forced through rear duct port 44 and into the common duct 50. Front blower 24' pulls air from common duct 50, through front duct port 36, and ultimately blows it back into cabin space C' through ventilation outlet 35'. Just as it the ventilation mode, the two blowers 24' and 40 work in series, so the power needed for the recirculating flow is shared. Neither blower need turn as rapidly as a conventional single blower would, thereby inherently reducing blower noise. Furthermore, the closed, continuous common duct 50 prevents the direct, open noise path to the cabin space C' that exists with the conventional recirculation mode described above.

Variations in the disclosed embodiment could be made. The flapper doors could be replaced with film belts or any other valve mechanism that would selectively open up or block off the respective openings. The common duct 50 could be one or more ducts or the equivalent, and could extend elsewhere than along the floor 20. However, that is the most convenient location, and it is unlikely that one would ever wish to reverse the air flow pattern, that is, vent air to flow nearer the floor and return air to run nearer the roof. The exhaust air could be exhausted even more directly from the cabin space C, that is, directly outside, rather than to the trunk space 16. However, the trunk space 16 is a convenient exhaust air site in vehicles that have one. Therefore, it will be understood that it is not intended to limit the invention to just the embodiment disclosed.

We claim:

1. For use in an automotive vehicle having a cabin space with a front, rear, upper roof structure and lower floor structure, a ventilation system, comprising, a ventilation housing at the front of said cabin space having a ventilation outlet opening into said cabin space, an outside air inlet opening outside of said cabin space, and a front duct port located adjacent to said outside air inlet, an air valve in said ventilation housing adapted to be selectively moved between an outside air mode that opens said outside air inlet to said ventilation housing and blocks said front duct port, and a recirculation mode that opens said front duct port to said ventilation housing and blocks said outside air inlet, a blower in said ventilation housing that pulls air through either said selected outside air inlet or front duct port into said ventilation housing and forces it through said ventilation outlet into said cabin space, an exhaust housing at the rear of said cabin space having a exhaust outlet opening outside of said cabin space, a cabin air inlet opening into said cabin space, and a rear duct port located adjacent to said exhaust outlet, an air valve in said exhaust housing adapted to be selectively moved between an exhaust air mode that opens said outside exhaust housing to said exhaust outlet and blocks said rear duct port, and a recirculation mode that opens said rear duct port to said exhaust housing and blocks said exhaust outlet, a blower in said exhaust housing that pulls air from said cabin air inlet into said exhaust housing and forces it through either said selected exhaust outlet or rear duct port, and, a common duct extending continuously between said front and rear duct ports, whereby, when said air ventilation housing and exhaust housing valves are moved simultaneously to their respective outside air and exhaust modes, outside air is pulled in series through said outside air inlet and into said ventilation housing, blown into said cabin space through said ventilation outlet, pulled toward the rear of said cabin space and into said exhaust housing through said cabin air inlet, and then blown to the outside through said exhaust outlet, with the air movement force provided and shared in series by said blowers, and when said valves are moved simultaneously to the recirculation mode, air is recirculated from said exhaust housing to said ventilation housing through said continuous duct.

2. A ventilation housing according to claim 1, further characterized in that said common duct extends along said lower floor structure.

3. A ventilation system according to claim 1, further characterized in that said vehicle has a trunk space located behind the rear of said cabin space, and said exhaust housing exhaust outlet opens into said trunk space.

* * * * *